US010007443B1

(12) United States Patent
Rajadnya et al.

(10) Patent No.: US 10,007,443 B1
(45) Date of Patent: Jun. 26, 2018

(54) HOST TO DEVICE I/O FLOW

(71) Applicant: EMC IP Holding Company LLC, Hopkinton, MA (US)

(72) Inventors: Samir Rajadnya, San Jose, CA (US); Karthik Ramachandran, Cupertino, CA (US); Todd Wilde, Palo Alto, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 93 days.

(21) Appl. No.: 15/087,953

(22) Filed: Mar. 31, 2016

(51) Int. Cl.
```
G06F 13/36      (2006.01)
G06F 13/00      (2006.01)
G06F 3/06       (2006.01)
G06F 13/16      (2006.01)
G06F 13/42      (2006.01)
G06F 13/40      (2006.01)
```

(52) U.S. Cl.
CPC .......... G06F 3/0613 (2013.01); G06F 3/0659 (2013.01); G06F 3/0688 (2013.01); G06F 13/1673 (2013.01); G06F 13/4022 (2013.01); G06F 13/4282 (2013.01); G06F 2213/0026 (2013.01)

(58) Field of Classification Search
None
See application file for complete search history.

(56) References Cited

U.S. PATENT DOCUMENTS

| | | | | |
|---|---|---|---|---|
| 5,237,661 A | * | 8/1993 | Kawamura | G06F 5/06 707/999.001 |
| 7,782,869 B1 | * | 8/2010 | Chitlur Srinivasa | G06F 9/5011 370/230 |
| 2007/0260447 A1 | * | 11/2007 | Canton | G06F 9/45537 703/27 |
| 2008/0270733 A1 | * | 10/2008 | Sakaguchi | G06F 3/0608 711/173 |
| 2011/0010427 A1 | * | 1/2011 | Jnagal | G06F 3/0605 709/213 |
| 2013/0166879 A1 | * | 6/2013 | Sun | G06F 9/52 712/30 |
| 2016/0203080 A1 | * | 7/2016 | Bert | G06F 12/0835 711/114 |

* cited by examiner

*Primary Examiner* — Hyun Nam
(74) *Attorney, Agent, or Firm* — Van Pelt, Yi & James LLP

(57) ABSTRACT

One or more virtual functions is exposed via a shared communication interface. A plurality of I/O buffers shared across said virtual functions are provided. For each of said one or more virtual functions, a corresponding submission queue comprising one or more virtual submission queue entries (SQEs) is used, wherein a memory access device is configured to: receive data pushed to the memory access device by a client host system, store the data in an allocated one of the I/O buffers, receive a submission queue entry (SQE) that invokes one of said virtual functions with respect to the data, and use a corresponding one of the plurality of logic circuits that is associated with the invoked virtual function to perform the virtual function with respect to the data as stored in the allocated I/O buffer.

20 Claims, 8 Drawing Sheets

HOST TO DEVICE I/O FLOW

BACKGROUND OF THE INVENTION

High-speed serial buses like PCI Express provide a foundational bus standard for high performance storage systems. These storage systems based on high performance non-volatile memory (NVM) media require large number of I/O queues, deep I/O queues, and exploitation of parallelism.

Field programmable gate array (FPGA) based controllers for NVM media offer flexibility, especially when the NVM media is based on emerging technology. However, FPGAs have limited memory space for the large and deep I/O queues required for these bus standards.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Virtual I/O queueing is disclosed. On an FPGA with limited memory, virtualization is used to expose logical block address spaces, and submission queues to a client host system, that are larger than what is implemented inside the FPGA by dynamically managing a smaller set of Virtual Logical block addresses (VLBAs) and Virtual Submission Queues (VSQs). A state machine manages a shared pool of buffers across a broad number of VLBAs. Similarly, a state machine manages a shared pool of queues across a broad number of VSQs. These permit the FPGA to use, for example, an NVMe protocol for NVM technology, or any other high performance priority protocol denoted throughout this specification generically as a "logical device interface for accessing non-volatile storage media" to interface with emerging NVM technology.

In one embodiment, an emerging NVM technology is next generation memory, for example a low-latency memory technology.

Figure 1:
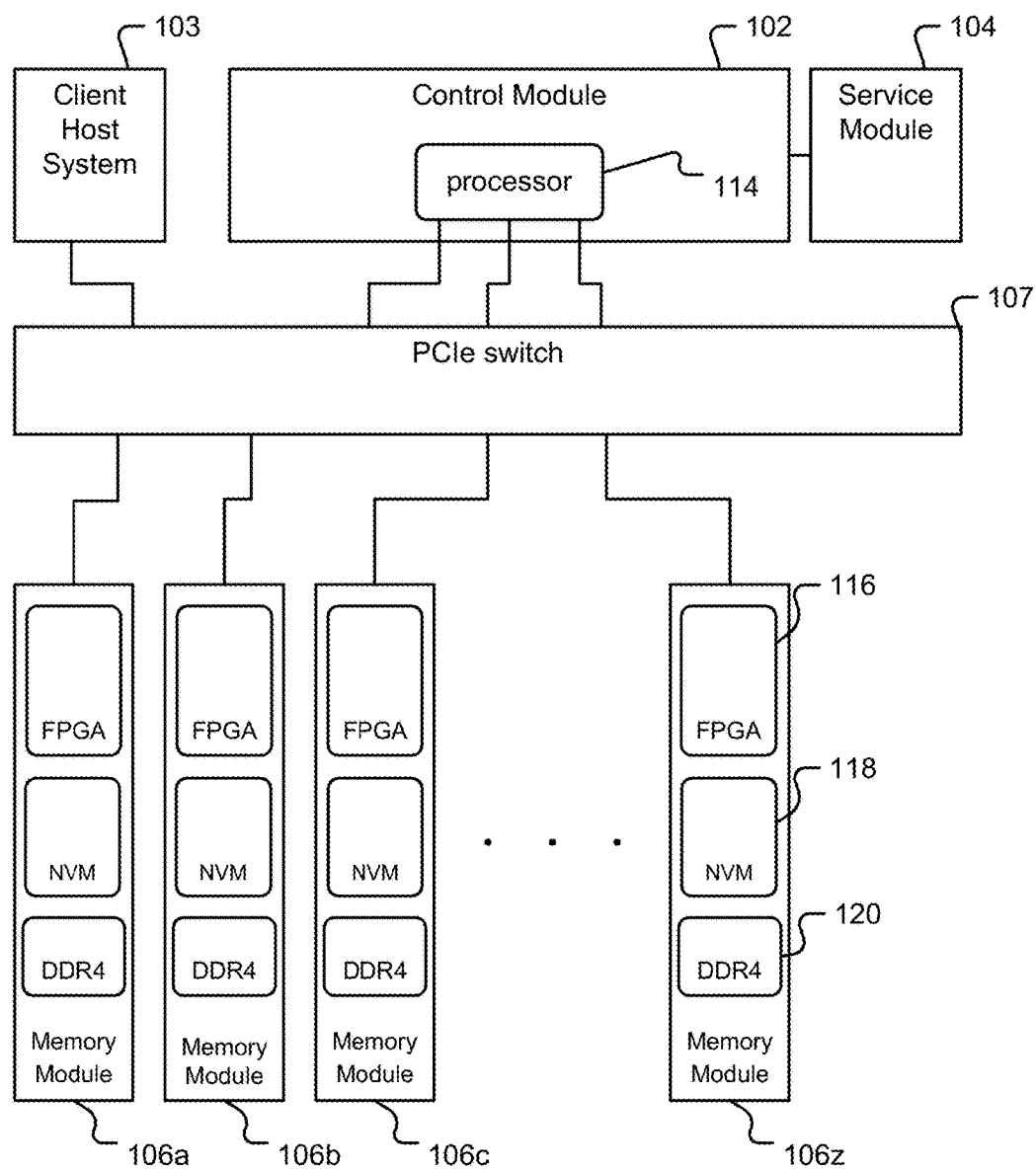
FIG. 1 is a block diagram illustrating an embodiment of a system for a memory controller device.

FIG. 1 is a block diagram illustrating an embodiment of a system for a memory controller device. The system in FIG. 1 comprises a control module (102) coupled to a client/host system (103), a service module (104) and a plurality of memory modules (106a-106z) via a PCIe switch (107). In one embodiment, up to 36 memory modules (106) may be used. The control module uses a high throughput bus to couple to the host, for example PCIe Gen 3 with between 4 and 96 lanes. Within the control module (102) there are one or more processors (114) that are external to the memory modules (106a)-(106z).

The control module (102) is coupled by PCIe to each memory module (106z), which comprises: an FPGA controller (116); a non-volatile memory media (118), and an associated external RAM as DDR4 buffer/cache (120). Within an FPGA (116) is a logic circuit configured to be a media controller (MC). In one embodiment, a non-volatile memory media (118) may include next generation memory, or may comprise a heterogeneous mixture of next generation memory and NAND-based flash. For example, for a total possible 36 memory modules (106a-z), the system may permit a "3+15/3+15" configuration using two configurations, each configuration comprised of three next generation memory modules with fifteen NAND-based flash memory modules.

Figure 2:
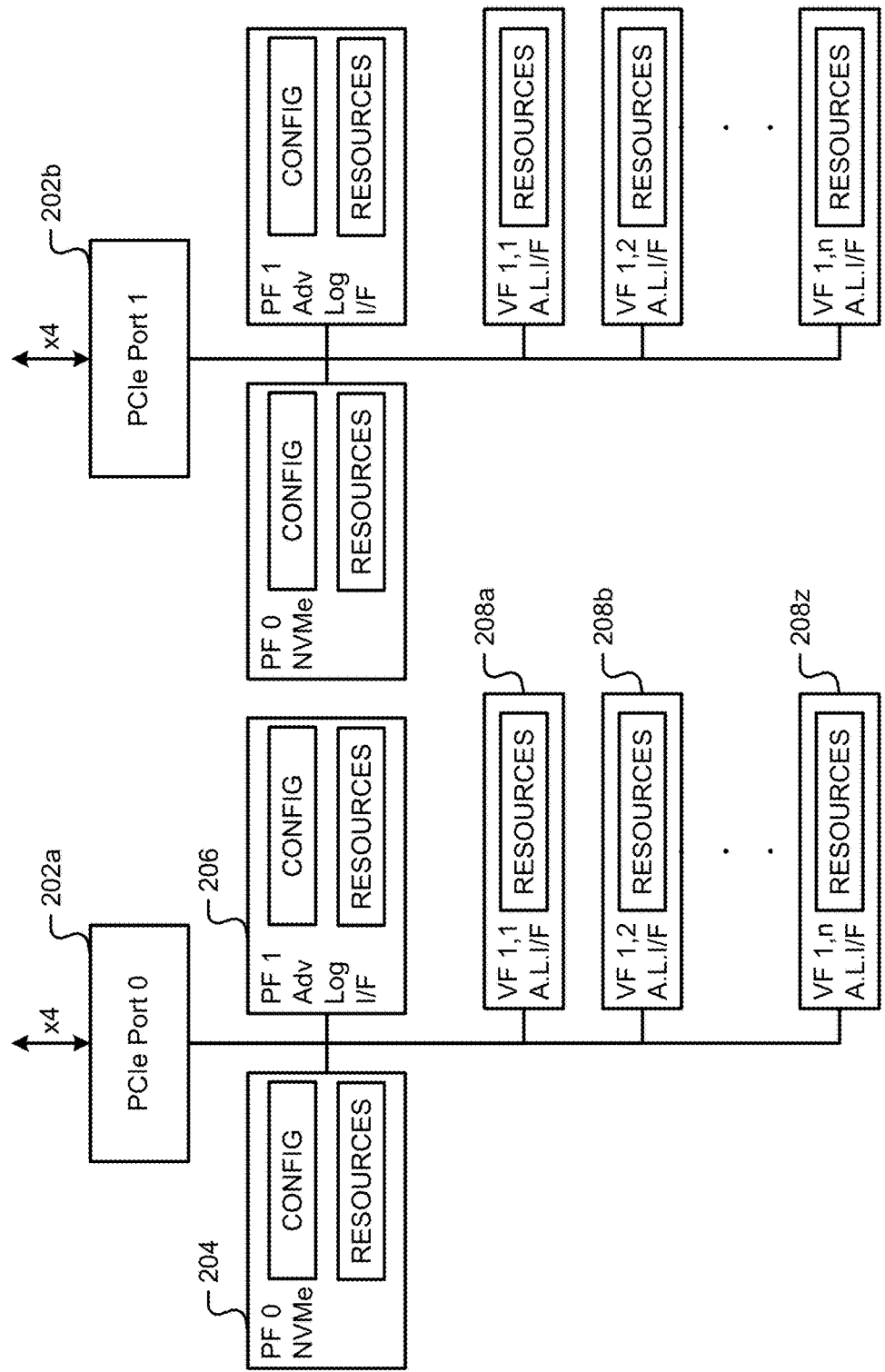
FIG. 2 is a block diagram illustrating an embodiment of a system for port configuration.

FIG. 2 is a block diagram illustrating an embodiment of a system for port configuration. One or more PCIe ports (202) are provided by the MC (116) in the FPGA (116). In one embodiment, two PCIe ports are provided by the MC (116), Port0 (202a) and Port1 (202b). If a port is disabled, receiver termination is off and all SERDES lanes are placed in a high impedance state. Each port has a separate fundamental reset, and error conditions in the PCIe state machine associated with one port may not have an effect upon the other port. Both ports may operate in PCIe endpoint mode (EP). Each port may have a separate reference clock, be able to use SSC independently, and negotiate link speed and other properties independently.

As shown in FIG. 2, the PCIe ports (202a, 202b) export a set of physical functions (PFs) and virtual functions (VFs) for the associated port, for NVMe or other logical device interfaces for accessing non-volatile storage media. A logical device interface for accessing non-volatile storage media may include any I/O protocol based on PCIe intended to permit high-performance transfer for NVM technologies.

For example An advanced logical device interface for accessing non-volatile storage media may comprise kernel and hypervisor bypass intended to permit fastest possible non-volatile storage access for latency-sensitive applications and/or low latency NVM technologies.

In one embodiment one (204) NVMe controller is supported for each PCIe host port with one or more of the following characteristics:

An NVMe controller provides NVMe transport compatibility with an NVMe specification;

An NVMe controller provides 1 admin queue and up to 128 configurable I/O queues;

An NVMe controller provides BAR0 and BAR1 MMIO access serviced by the media controller (116) firmware; and NVMe vendor-specific BAR4 direct memory interface for Controller Memory Buffer and SQs In one embodiment, one (206) advanced logical device interface for accessing non-volatile storage media controller is supported for each PCIe host port with one or more of the following characteristics:

Up to 128 PCIe SR-IOV virtual functions (VFs) (208a, 208b, 208z) are supported per advanced logical device interface for accessing non-volatile storage media physical function;

An advanced logical device interface for accessing non-volatile storage media controller provides 1 admin queue and up to 128 configurable I/O queues;

An advanced logical device interface for accessing non-volatile storage media controller provides BAR0 and BAR1 MMIO access serviced by the media controller (116) firmware; and Advanced logical device interface for accessing non-volatile storage media vendor-specific BAR4 direct memory interface are supported for Controller Memory Buffer and SQs.

In one embodiment, advanced logical device interface for accessing non-volatile storage media controllers are associated with PCIe functions, and implement a transport for communicating with an advanced logical device interface for accessing non-volatile storage media subsystem, that manages the NVM storage media (118). NVM media controllers (116) implement an advanced logical device interface for accessing non-volatile storage media subsystem with multiple advanced logical device interface for accessing non-volatile storage media controllers per PCIe port, providing many applications with access to the media.

In one embodiment, advanced logical device interface for accessing non-volatile storage media subsystems are associated with the CM (102) that implements system-level functionality such as pooled storage across multiple advanced logical device interface for accessing non-volatile storage media subsystems, access control, hybrid storage across multiple types of media, advanced RAID recovery, and other data services.

While the CM (102) is given with an example architecture in FIG. 1, without limitation, a CM may generically refer to any combination of controller hardware, firmware and software that provides these functions. For example, CM functionality may be implemented inside of the MC (116) firmware, on a storage controller (102) managing a set of memory modules, or inside of a host (103) managing a set of local next generation based SSDs.

In one embodiment, in order to implement advanced logical device interfaces for accessing non-volatile storage media, a fabric supporting reliable packet delivery and DMA connects host (103) memory and MC (116) memory. Host (103) and controller (116) memory may be connected in any of the following configurations as part of an overall system storage fabric:

A single PCIe addressing domain, when the NVM (118) is used as a PCIe 2.5" SSD or PCIe card in a host (103);

Two PCIe domains, separated by a PCIe non-transparent bridge and connected with cables and switches, when the NVM (118) is a memory module (106) in a PCIe storage system; and Two PCIe domains, linked together by RNICs and a switched RDMA fabric (e.g. RoCE+Ethernet), wherein the NVM (118) is a memory module (106) in a an RDMA storage system.

Figure 3A:
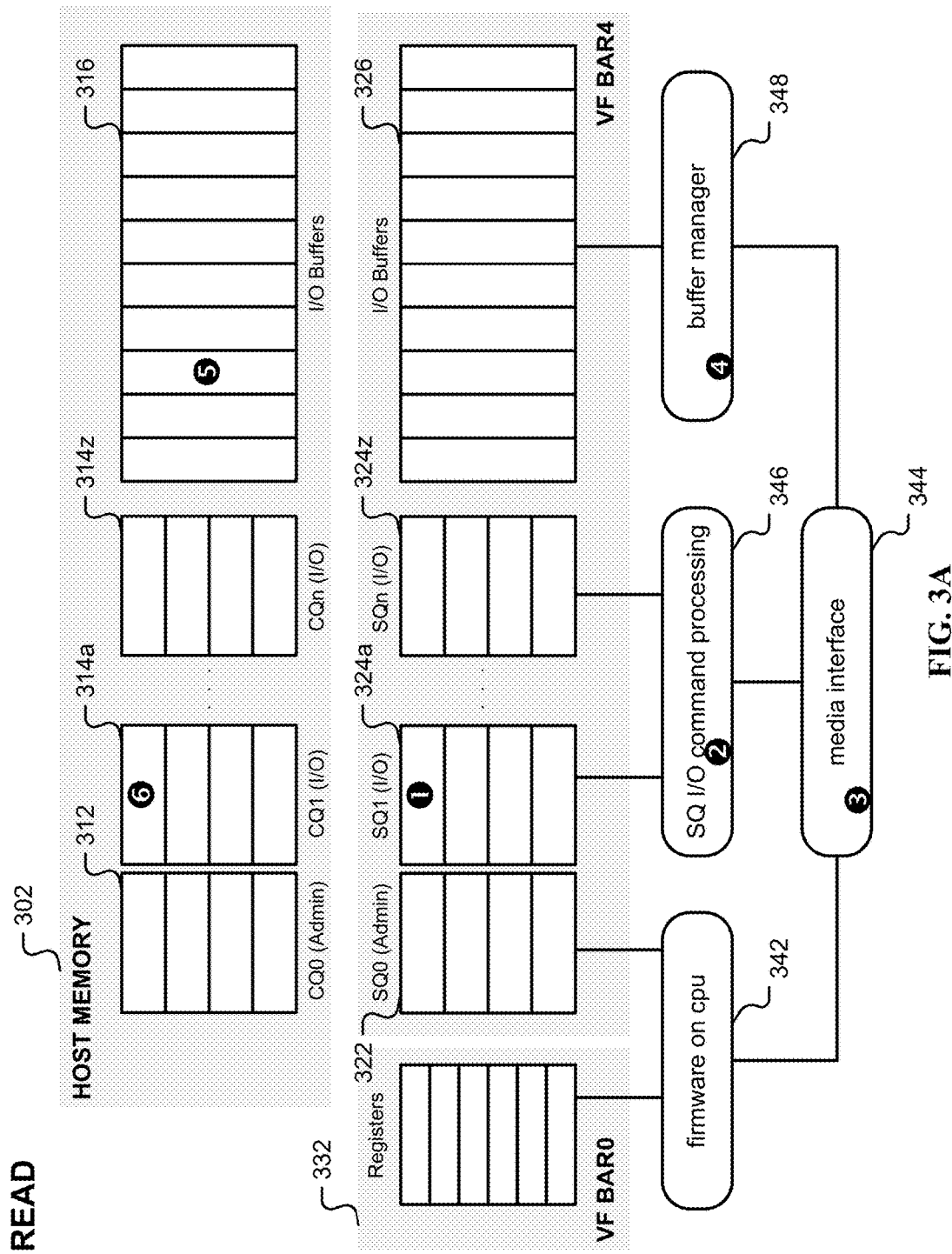
FIG. 3A illustrates the operation of a READ command.
Figure 3B:
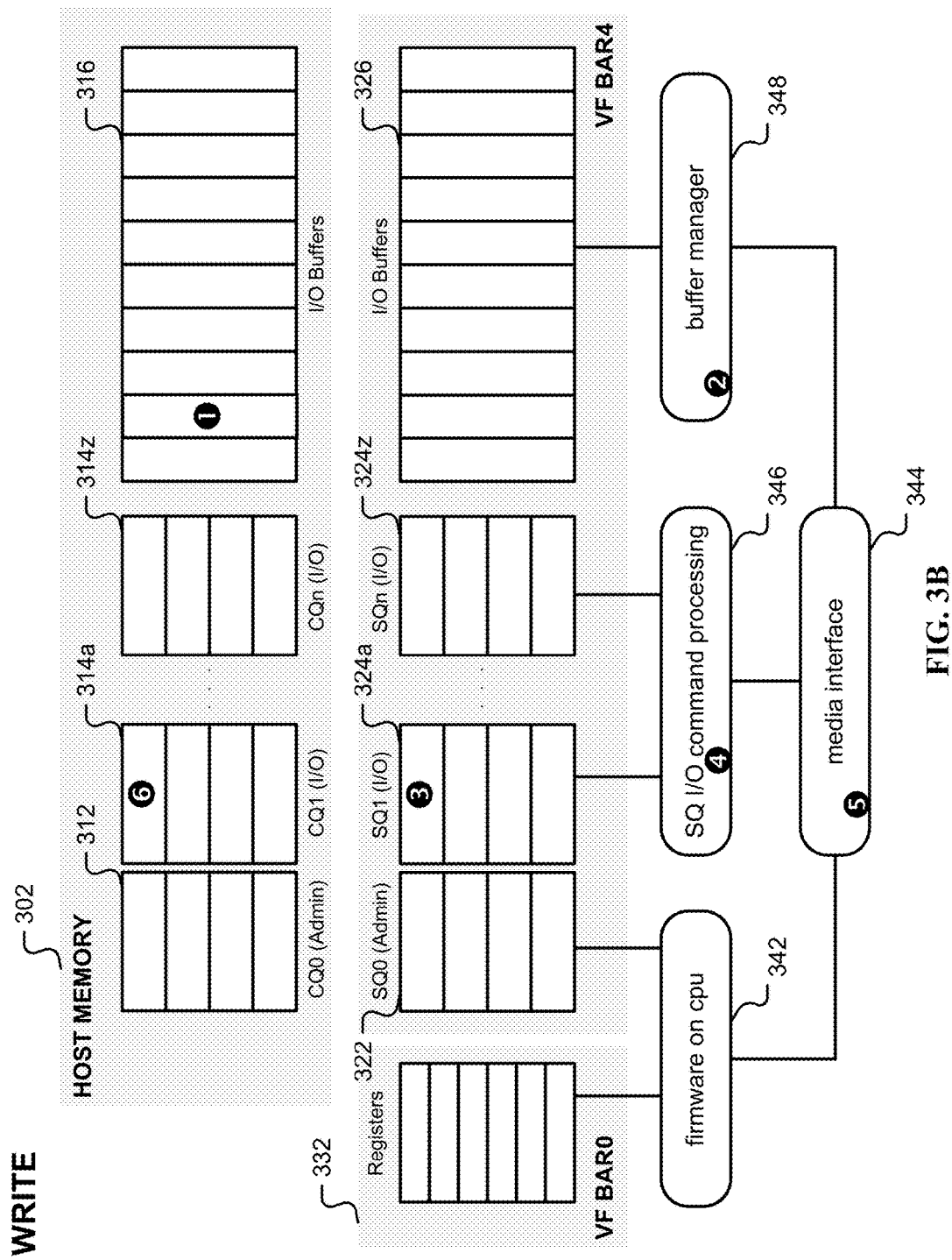
FIG. 3B illustrates the operation of a WRITE command.

FIGS. 3A and 3B illustrate basic functional layout of an active advanced logical device interface for accessing non-volatile storage media controller, corresponding to one advanced logical device interface for accessing non-volatile storage media VF in the PCIe hierarchy. In both FIGS. 3A and 3B, a functional diagram for host memory (302) for the client host system (103) comprises an admin completion queue (CQ) called CQ0 (312), one or more I/O CQs called CQ1 (314a) . . . CQn (314z), and a set of I/O buffers (316).

In complimentary fashion, the vendor-specific BAR4 direct memory interface comprises the admin submission queue (SQ) called SQ0 (322), one or more I/O SQs called SQ1 (324a) . . . SQn (324z), and a set of I/O buffers (326). Registers (332) are exposed for the VF BAR0 MMIO access.

The firmware on a processor (342) instantiated in the FPGA (116) is coupled to the VF BAR0 registers (332) and the SQ0 (322), as well as a media interface (344) on the FPGA (116). The media interface (344) is coupled to SQ I/O command processing (346) on the FPGA (116) which in turn are coupled to the SQ1 . . . SQn (324a-z). The media interface (344) is also coupled to buffer manager (348) on the FPGA (116), which is coupled to the I/O buffers (326).

FIG. 3A illustrates the operation of a READ command using the black circled numbers:

1. An SQ entry (SQE) containing a READ opcode, and a pointer to host memory buffer on (316), is pushed to SQ1 (324a);
2. When the SQE reaches the head of the processing queue SQ1, the SQE is scheduled for execution in SQ I/O command processing (346), and the SQE's metadata about the object to be read is transformed into a logical offset to a fragment address;
3. The READ is scheduled for execution by the media interface (344). The media interface converts the fragment address to a physical address to determine the device queue associated with the corresponding media die(s) (118) for (106a . . . 106z);
4. Once the READ reaches the head of the media device queue, a free buffer is allocated from the buffer manager (348) and the data is clocked into this buffer. ECC correction is applied as data moves through the media interface (344) into the buffer, and the status is recorded;
5. The READ buffer is passed to a DMA engine to DMA, or "push", the data back to the original host buffer (316). Once this DMA is completed, the buffer is freed back to the buffer manager (348); and
6. The READ now complete, a corresponding CQ entry (CQE) is computed so that the status can be pushed back to the host's CQ at the next free location (314a).

FIG. 3B illustrates the operation of a WRITE command using the black circled numbers:

1. A free destination buffer location in the controller memory buffer (326) is allocated (348) and a local DMA engine is used to push the data to be written to this location, thus when the first transaction layer packet (TLP) corresponding to this buffer is received, the buffer manager (348) allocates a free buffer from the buffer pool to begin receiving data from the host;
2. An SQE containing the WRITE opcode, and a pointer to host memory buffer (316), is pushed to SQ1 (324a);
3. When the SQE reaches the head of the processing queue, the SQE is scheduled for execution (346), and the SQE's metadata about the object to be written is transformed into a logical offset to a fragment address;
4. The WRITE is scheduled for execution by the media interface (344). The media interface converts the fragment address to a physical address to determine the device queue associated with the corresponding media die(s) (118) for (106a . . . 106z). Once the WRITE reaches the head of the media device queue, data is clocked from the buffer out to the media. ECC is generated as data moves from the buffer through the media interface (344). Once this WRITE is completed, the buffer (326) is freed back to the buffer manager (348) by the media interface (344); and
5. The WRITE is now complete, and a corresponding CQE is computed so that the status can be pushed back to the host's CQ at the next free location (314a).

In one embodiment, the PCIe configuration space for an advanced logical device interface for accessing non-volatile storage media PF or VF is configured identically to an NVMe function, as described in the NVMe specification, except that the BAR4 in the PCIe header is implemented and provides posted write access to the advanced logical device interface for accessing non-volatile storage media controller memory buffer, and is part of the advanced logical device interface for accessing non-volatile storage media implementation. Each advanced logical device interface for accessing non-volatile storage media PCIe PF or VF implements an advanced logical device interface for accessing non-volatile storage media transport, capable of low-latency communication between a host and an advanced logical device interface for accessing non-volatile storage media controller. Multiple advanced logical device interface for accessing non-volatile storage media controllers are provided by a single media controller (116), in the form of multiple PCIe ports and functions.

In one embodiment, advanced logical device interface for accessing non-volatile storage media controllers support a Controller Memory Buffer (CMB) exposed through BAR4 of the advanced logical device interface for accessing non-volatile storage media PF or VF. Firmware may have the ability to configure the PCIe 64-bit physical address of the CMB, visible to the surrounding PCIe domain. Advanced logical device interface for accessing non-volatile storage media PFs and VFs use CMB memory for both Data Ingress TLPs (host writes) and SQ TLP processing. The Controller Memory Buffer will support PCIe Posted Writes only; access to this memory from PCIe MMIO or Non-Posted Reads will result in an PCIe Unsupported Request (UR) error being returned to the requestor.

In one embodiment advanced logical device interface for accessing non-volatile storage media driver code configures the advanced logical device interface for accessing non-volatile storage media Controller and uses CMB memory for SQs, according to a set of conventions exported by the media controller (116) as to the maximum queue depth of SQs and their expected offset locations with the CMB. This mechanism will permit the media controller (116) to map PCIe posted write TLPs directly to the SQ manager inside the controller and determine the corresponding queue and queue location. A phase bit inside of the SQE itself is used to indicate that the entire SQE has been received.

In one embodiment, the remaining space in CMB memory is used for buffers, and managed from a host memory allocation perspective by the host, using a libvmem allocator. As TLPs flow into the CMB memory, the media controller (116) internally maps regions of this portion of CMB memory using its buffer manager, and the state of these buffers may be managed completely by the media controller (116).

In one embodiment, advanced logical device interface for accessing non-volatile storage media Submission Queues (SQs) are predefined regions of the Controller Memory Buffer, aligned at a 4K boundary, containing two or more slots for 64B commands, arranged as a ring buffer. Commands are submitted from the host using PCIe posted writes, and a Phase Tag (P) embedded in the SQ Entry (SQE) is used to indicate when the new command can be scheduled for execution. The SQ entries for the advanced logical device interface for accessing non-volatile storage media command sets may have a common format that includes an OP2 opcode indicating a selected command in a command set, and an ARG1 . . . ARG2 argument space.

In one embodiment, advanced logical device interface for accessing non-volatile storage media Completion Queues (CQs) are predefined regions of host memory, aligned at a 4K boundary, containing two or more slots for 16B completions, arranged as a ring buffer. Completions are sent from the controller to the host using PCIe posted writes, and a Phase Tag (P) embedded in the CQ Entry (CQE) is used to indicate when a new completion has been received. The CQ entries for the advanced logical device interface for accessing non-volatile storage media command sets may have a common format that includes an RVAL return value.

In one embodiment, an advanced logical device interface for accessing non-volatile storage media controller is assigned a maximum number of outstanding I/O commands by the advanced logical device interface for accessing non-volatile storage media subsystem, related to the amount of internal buffer space that has been provisioned for the controller. A command may be used to retrieve the CREDITS feature property to determine this limit. The host is responsible for adhering to the limit, and may choose to centrally pool these credits or provision them across the various I/O queues that are allocated. If more than CREDITS I/O commands are submitted simultaneously across all active I/O queues, the advanced logical device interface for accessing non-volatile storage media controller will log an error and reset reflecting a fatal error. Pending commands may conflict across VFs for buffer resources, so one or more of the following address the conflict: a credit exchange implemented in the CQE; asynchronous updates; and a retry and back off strategy.

Figure 4:
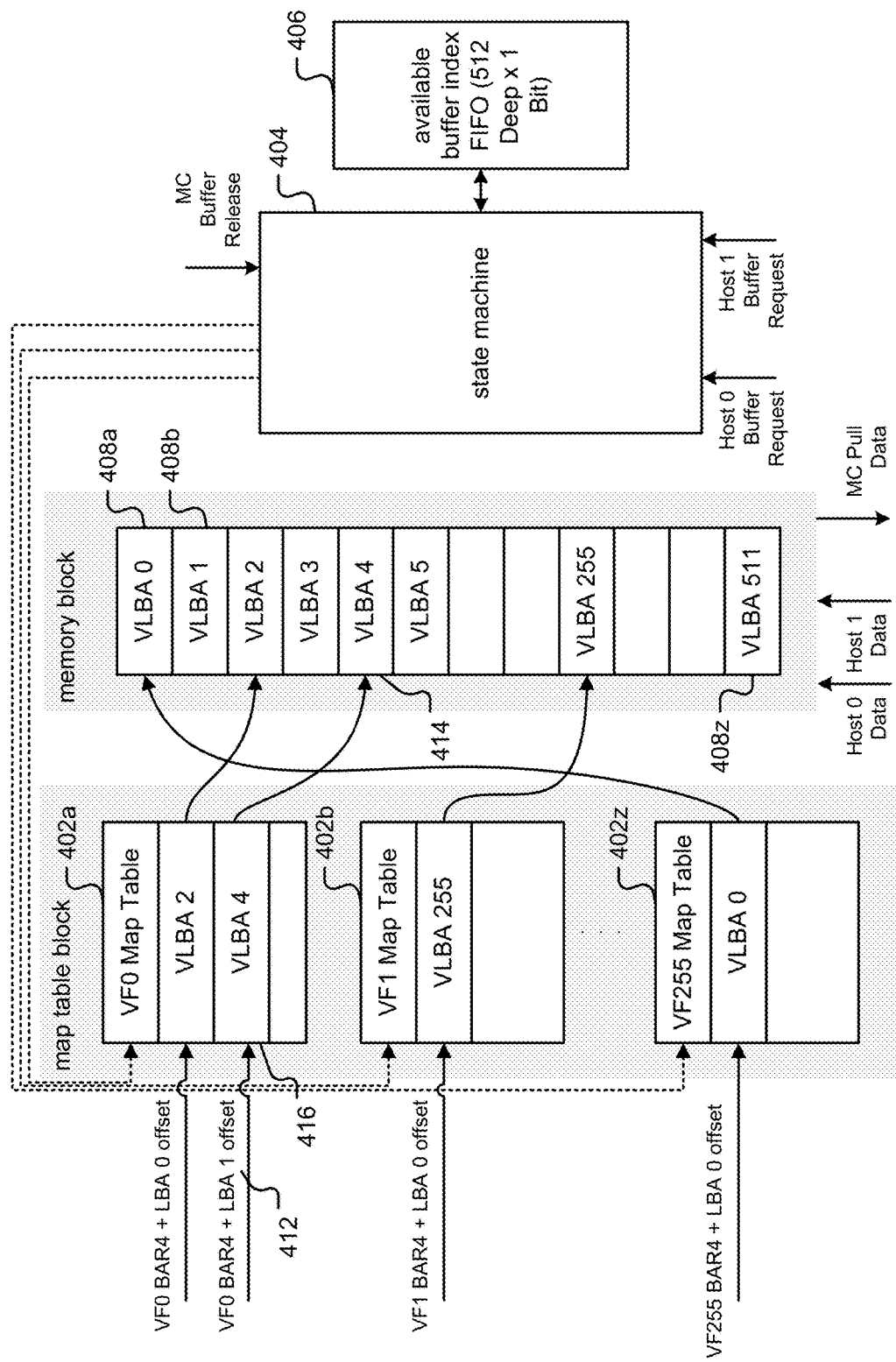
FIG. 4 is a block diagram illustrating an embodiment of a system for a virtual LBA scheme.

FIG. 4 is a block diagram illustrating an embodiment of a system for a virtual LBA scheme. In one embodiment, the system in FIG. 4 is part of the management of I/O buffers (326), (348) in FIGS. 3A-3B.

In one embodiment, the virtual LBA is a shared pool of 512 buffers shared among 256 virtual functions. This virtual LBA scheme permits management of a limited number of write buffers on FPGA (116) across 256 virtual functions. An example sequence of events about buffer assignment and buffer release includes:

1. An advanced logical device interface for accessing non-volatile storage media data transfer (512K, 4K or 8K) is pushed into the FPGA (116);
2. As shown in FIG. 4, LBAs are directly mapped into BAR4 space for each VF from VF0 (402*a*), VF1 (402*b*), through to VF255 (402*z*). The maximum number of buffers required for any VF will be less than or equal to 512. In one embodiment, in the cases of a 512 and/or a 4K transfers, a single LBA is assigned. In the case of an 8K I/O transfer two LBAs are assigned. For example, for VF0 BAR 4 plus an LBA1 offset may access data in the VF0 map table (412);
3. When PCIe port 0 (202*a*) or PCIe port 1 (202*b*) requests a buffer, a state machine (404) looks at VLBA buffer indices in a FIFO (406) to find available buffers amongst the shared pool of 512 buffers (408*a*-408*z*). It assigns the first available buffer from the list. For the example above, VLBA4 (414) is determined to be the first available buffer;
4. Client host system (103) directly writes data to its assigned buffer (414);
5. The state machine (404) updates a corresponding entry in the map table (416). Note that in the embodiment given there are 256 map tables each with 512 entries; and
6. When MC (116) pulls data from its VLBA, the buffer index for that particular VLBA (for example, VLBA4) is put back in the FIFO (406) by state machine (404). Thus, after the MC (116) pulls data from the VLBA, that particular VLBA (for example, VLBA4) is returned to VLBA free list.

Figure 5:
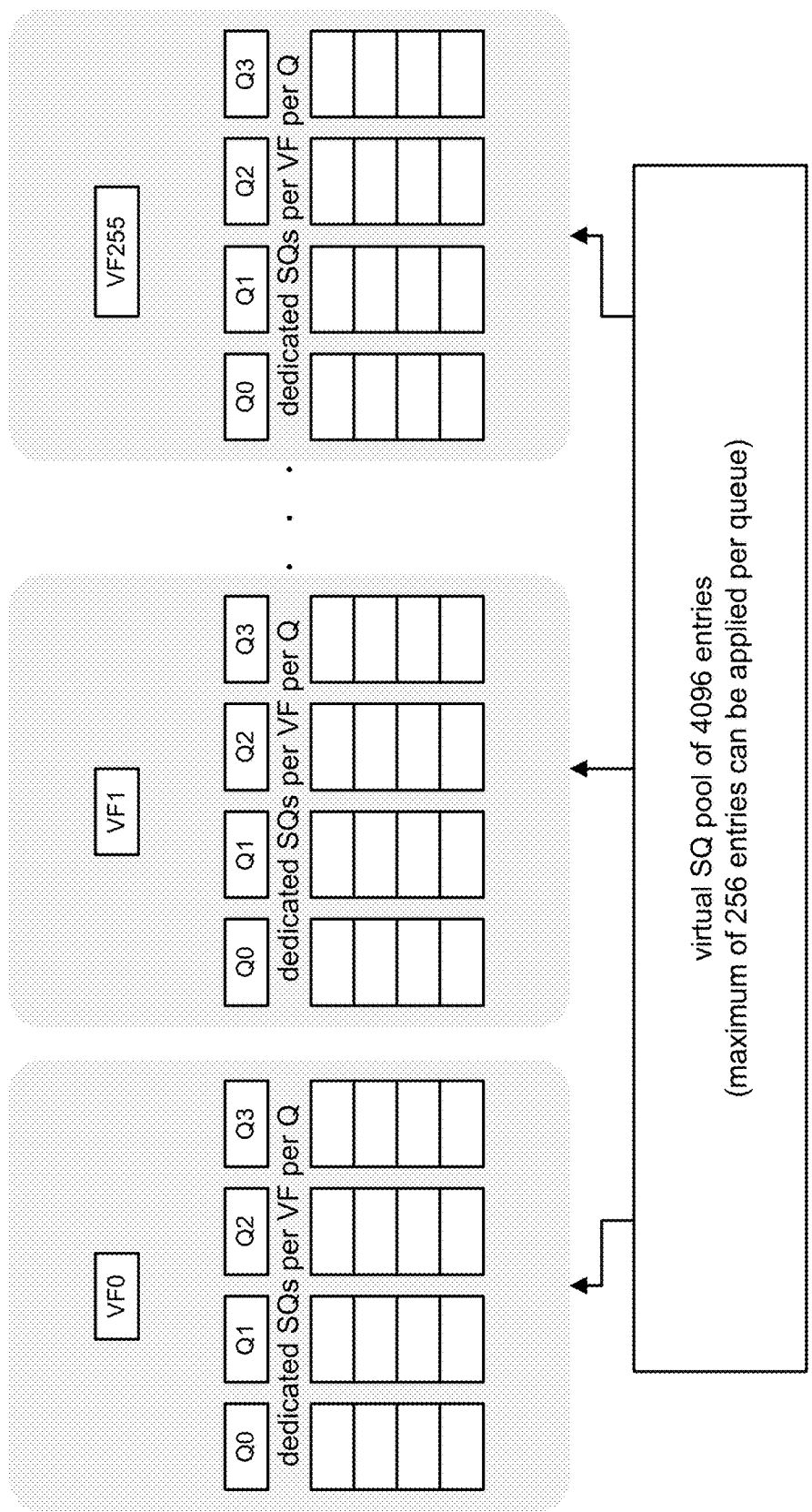
FIG. 5 is a block diagram illustrating an embodiment of a system for VSQs.

FIG. 5 is a block diagram illustrating an embodiment of a system for VSQs.

In one embodiment, space allocated for SQ entries is greater than VLBA entries as shown in FIG. 4, since LBA entries are only required for write accesses while SQs are required for both write and read accesses. For example, the total number of SQ entries may be 8192, which is greater than 512 LBA entries.

When determining the VSQ scheme, a pessimistic case possible is that all LBAs may get assigned to a single VF and single thread within that single VF. Thus, the SQ scheme has to be flexible enough to support a maximum of 512 SQ entries per queue. This is achieved through virtualization of the queues. In one embodiment, the total number of SQ entries is 8192, and 4096 entries are virtualized while 4096 entries are not virtualized and are instead dedicated, as shown in FIG. 5.

In one embodiment, for virtualized SQ entries a maximum of 256 entries may be assigned to any VF. Examples of how 4096 entries can be virtualized include one or more of the following:

(256 VFs)×(1 queues per VF)×(16 entries per queue);

(256 VFs)×(2 queues per VF)×(8 entries per queue);

(256 VFs)×(4 queues per VF)×(4 entries per queue);

(8 VFs)×(2 queues per VF)×(256 entries per queue); and (4 VFs)×(4 queues per VF)×(256 entries per queue).

In one embodiment, there is a dedicated space for 4096 SQ entries that are not shared. Dedicated SQs help ensure one queue does not block other queues, and may be fixed, for example and without limitation, as 256 VFs×4 queues×4 (entries per queue).

Figure 6:
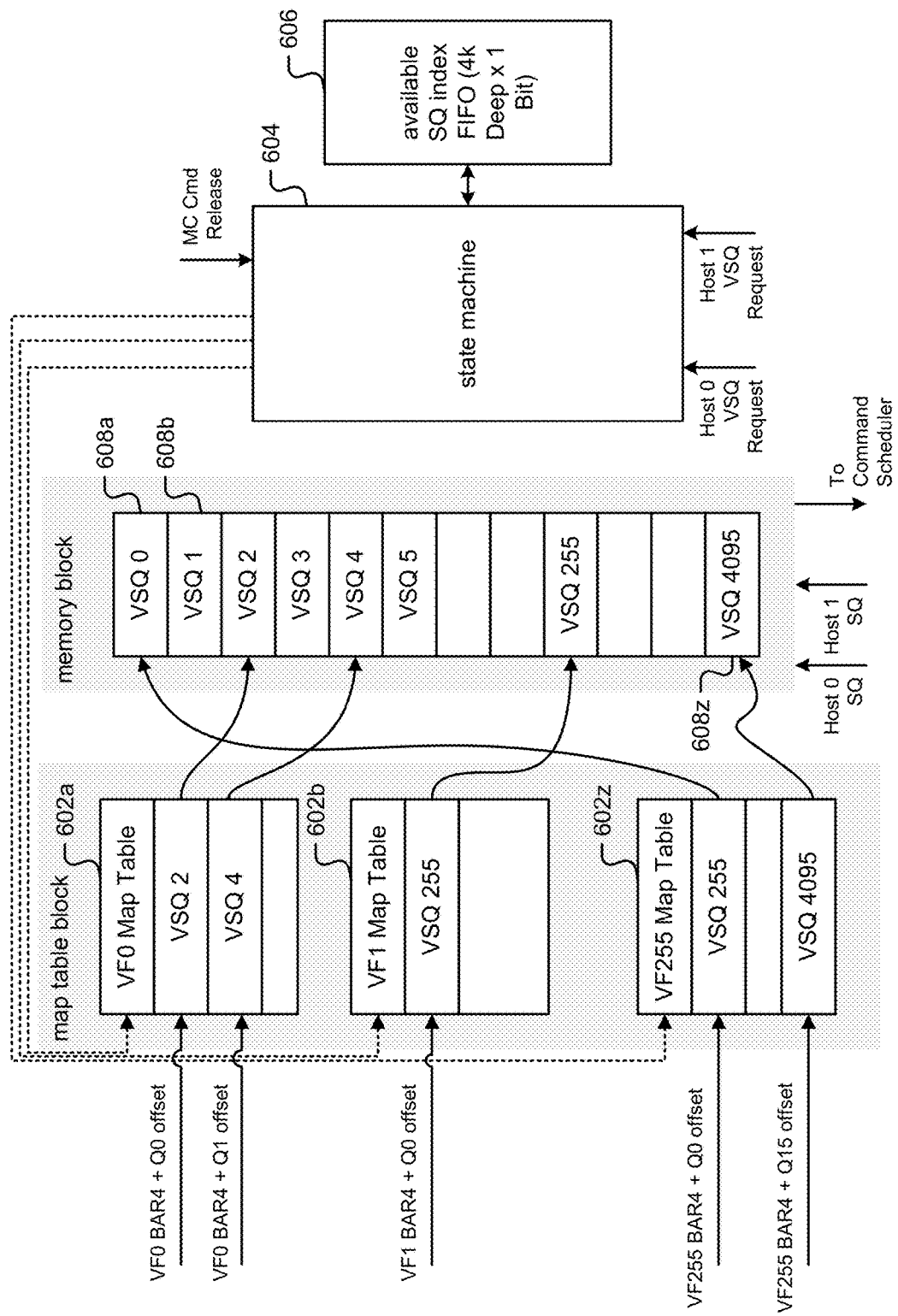
FIG. 6 is a block diagram illustrating an embodiment of a system for a virtual SQ scheme.

FIG. 6 is a block diagram illustrating an embodiment of a system for a virtual SQ scheme. In one embodiment, the system in FIG. 6 is part of the management of I/O command processing (324*a*-*z*), (346) in FIGS. 3A-3B.

FIG. 6 is comparable to FIG. 4 with changes for the SQ entries instead of LBA entries. For example SQs are directly mapped into BAR4 space for each VF from VF0 (602*a*), VF1 (602*b*), through to VF255 (602*z*), depending on how the 4096 entries are virtualized as described in FIG. 5.

When PCIe port 0 (202*a*) or PCIe port 1 (202*b*) requires an SQ, a state machine (604) looks at VSQ indices in a FIFO (606) to find available VSQs amongst the shared pool of 4096 entries (608*a*-608*z*). It assigns the first available queue from the list, and the state machine (604) updates a corresponding entry in the map table (602).

When the MC (116) completes the access and no longer requires the SQ, the queue index for that particular VSQ is written into the FIFO (606) by the state machine (604), returning that VSQ to the free list.

Figure 7:
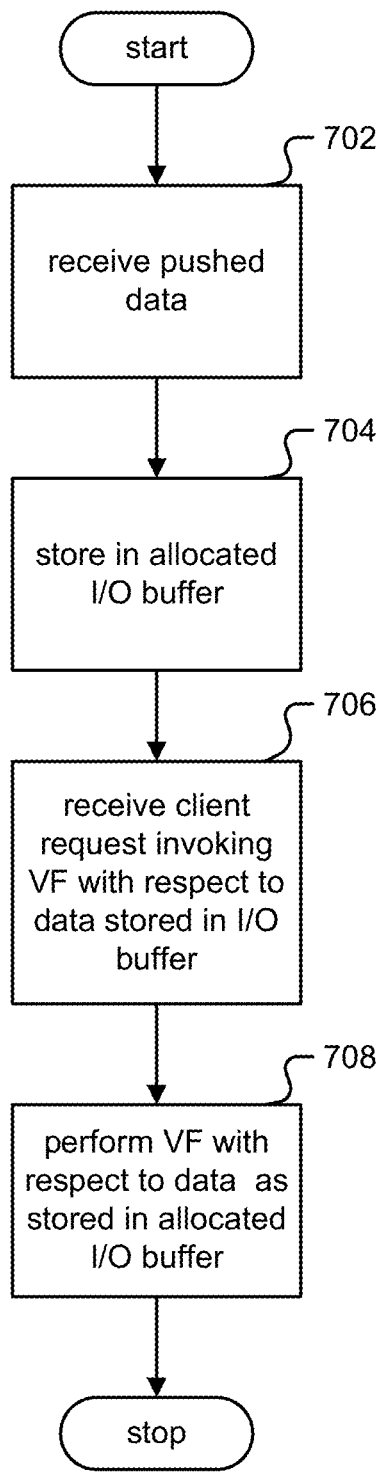
FIG. 7 is a flow chart illustrating an embodiment of a process for virtual I/O queueing.

FIG. 7 is a flow chart illustrating an embodiment of a process for virtual I/O queueing. In one embodiment, the process of FIG. 7 is carried out by the state machine (404) in FIG. 4 and/or the state machine (604) in FIG. 6. A plurality of logic circuits in the FPGA (116) are each configured to expose one or more VFs via a shared communication interface, for example PCIe. A fixed amount of memory shared across said virtual functions, for example accessible to FPGA (116), provide a fixed number of I/O buffers (408*a*-*z*) and/or queue entries (608*a*-*z*) shared across said virtual functions.

In step 702, the FPGA (116) receives data pushed to the FPGA (116) by a client host system (103). In step 704, the FPGA (116) stores the data in an allocated one of the I/O buffers (408). In step 706, the FPGA (116) receives a client request that invokes one of said VFs with respect to the data, and in step 708, the FPGA (116) uses a corresponding one of the plurality of logic circuits (404, 604) that is associated with the invoked virtual VF to perform the VF with respect to the data as stored in the allocated I/O buffer (408).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A memory access device, comprising:
   a plurality of logic circuits each configured to expose one or more virtual functions via a shared communication interface;
   a memory configured to provide a plurality of I/O buffers shared across said virtual functions; and
   for each of said one or more virtual functions, a corresponding submission queue comprising one or more virtual submission queue entries (SQEs);
   wherein the memory access device is configured to:
      receive data pushed to the memory access device by a client host system;
      store the data in an allocated one of the I/O buffers;
      receive a submission queue entry (SQE) that invokes one of said virtual functions with respect to the data; and
      use a corresponding one of the plurality of logic circuits that is associated with the invoked virtual function to perform the virtual function with respect to the data as stored in the allocated I/O buffer.

2. The memory access device of claim 1, wherein the device is a field programmable gate array (FPGA).

3. The memory access device of claim 2, wherein the plurality of logic circuits are programmable blocks of the FPGA.

4. The memory access device of claim 2, wherein the FPGA has limited memory.

5. The memory access device of claim 1, wherein each virtual function permits one or more of the following: a read access, a pushed read access, and a write access.

6. The memory access device of claim 1, wherein the shared communication interface is PCIe.

7. The memory access device of claim 1, wherein the memory access device is further configured such that in the event the client host system pushes data to one of the I/O buffers, and command is pushed to an SQE.

8. The memory access device of claim 7, wherein the memory access device is further configured to read an opcode for fetching data from an external NVM associated with the memory access device to the SQE.

9. The memory access device of claim 8, wherein the memory access device is further configured to push the external data from one of the I/O buffers to the client host system.

10. The memory access device of claim 8, wherein the memory access device is further configured to enqueue a completion message to a completion queue (CQ) associated with the client host system.

11. The memory access device of claim 1, wherein the allocated I/O buffer is selected based at least in part on the invoked virtual function availability.

12. The memory access device of claim 1, wherein the allocated SQ is selected based at least in part on the invoked virtual function availability.

13. The memory access device of claim 1, wherein for each of said one or more virtual function, the corresponding submission queue also comprises one or more dedicated SQ.

14. The memory access device of claim 1, further comprising a map table for mapping memory buffers exposed to a PCIe BAR4 direct memory interface to the allocated I/O buffer.

15. The memory access device of claim 1, wherein one client host system is allocated one virtual function such that each virtual function has a corresponding client in a plurality of supported clients.

16. The memory access device of claim 1, wherein the corresponding submission queue comprises one or more virtual SQs in one or more of the following: 256 VFs with one queue per VF with 16 entries per queue, 256 VFs with two queues per VF with 8 entries per queue, 256 VFs with four queues per VF with 4 entries per queue, 8 VFs with 2 queues per VF with 256 entries per queue, and 4 VFs with 4 queues per VF with 256 entries per queue.

17. The memory access device of claim 1, wherein the shared communication interface is advanced logical device interface for accessing non-volatile storage media over PCIe with SR-IOV.

18. The memory access device of claim 1, further comprising BAR0 MMIO access to one or more PCIe registers.

19. A method, comprising:
exposing one or more virtual functions via a shared communication interface;
providing a plurality of I/O buffers shared across said virtual functions; and
for each of said one or more virtual functions, using a corresponding submission queue comprising one or more virtual submission queue entries (SQEs);
wherein a memory access device is configured to:
receive data pushed to the memory access device by a client host system;
store the data in an allocated one of the I/O buffers;
receive a submission queue entry (SQE) that invokes one of said virtual functions with respect to the data; and
use a corresponding one of the plurality of logic circuits that is associated with the invoked virtual function to perform the virtual function with respect to the data as stored in the allocated I/O buffer.

20. A computer program product, the computer program product being embodied in a non-transitory computer readable storage medium and comprising computer instructions for:
exposing one or more virtual functions via a shared communication interface;
providing a plurality of I/O buffers shared across said virtual functions; and
for each of said one or more virtual functions, using a corresponding submission queue comprising one or more virtual submission queue entries (SQEs);
wherein a memory access device is configured to:
receive data pushed to the memory access device by a client host system;
store the data in an allocated one of the I/O buffers;
receive a submission queue entry (SQE) that invokes one of said virtual functions with respect to the data; and
use a corresponding one of the plurality of logic circuits that is associated with the invoked virtual function to perform the virtual function with respect to the data as stored in the allocated I/O buffer.

* * * * *